(12) United States Patent
Stamires et al.

(10) Patent No.: US 6,506,358 B1
(45) Date of Patent: Jan. 14, 2003

(54) PROCESS FOR THE PREPARATION OF QUASI-CRYSTALLINE BOEHMITES

(75) Inventors: Dennis Stamires, Newport Beach, CA (US); Paul O'Connor, Hoevelaken (NL); Gregory Pearson, Seabrook, TX (US); William Jones, Cambridge (GB)

(73) Assignee: Akzo Nobel B.V. (NL)

(*) Notice: Subject to any disclaimer, the term of this patent is extended or adjusted under 35 U.S.C. 154(b) by 0 days.

(21) Appl. No.: 09/636,694

(22) Filed: Aug. 11, 2000

Related U.S. Application Data

(63) Continuation-in-part of application No. 09/372,557, filed on Aug. 11, 1999, now abandoned.

(51) Int. Cl.$^7$ .................................................. C01F 7/00
(52) U.S. Cl. .................... 423/625; 423/628; 423/630; 423/275
(58) Field of Search ................................ 423/625, 628, 423/630, 275

(56) References Cited

U.S. PATENT DOCUMENTS

| | | | |
|---|---|---|---|
| 3,357,791 A | | 12/1967 | Napier .................... 23/143 |
| 3,739,062 A | | 6/1973 | Barsotti .................. 423/625 |
| 4,117,105 A | | 9/1978 | Hertzenberg et al. ....... 423/625 |
| 4,248,852 A | * | 2/1981 | Wakabayashi et al. |
| 4,318,896 A | * | 3/1982 | Schoonover |
| 4,332,782 A | * | 6/1982 | Scherzer et al. |
| 4,344,928 A | * | 8/1982 | Dupin et al. |
| 4,676,928 A | * | 6/1987 | Leach et al. |
| 4,797,139 A | | 1/1989 | Bauer ..................... 51/293 |
| 5,194,243 A | | 3/1993 | Pearson et al. ........... 423/625 |
| 5,718,879 A | | 2/1998 | Chopin et al. ............ 423/628 |
| 5,837,634 A | * | 11/1998 | Mclaughlin et al. |
| 6,027,706 A | * | 2/2000 | Pinnavaia et al. |

FOREIGN PATENT DOCUMENTS

| | | |
|---|---|---|
| EP | 0 130 835 A2 | 1/1985 |
| EP | 0 597 738 A1 | 5/1994 |

OTHER PUBLICATIONS

Patent Abstracts of Japan: Publication No.: JP10109030, Apr. 1998.
International Search Report, dated: Nov. 8, 2000 from PCT/EP 00/07792.
J. Medema, J. Catalysis, vol. 37 (1975), 91–100, No Month.
J. Wachowski, et al., Materials Chemistry, vol. 37 (1994), 29–38, No Month.
G. Yamaguchi, et al., Bull. Chem. Soc. Jap., vol. 32 (1959), 696–699, No Month.
G. Yamaguchi, et al., Chem. Soc. Jap., (Ind. Chem. Soc.), (1963), English Translation, 21 pages, No Month.

* cited by examiner

Primary Examiner—Steven Bos
(74) Attorney, Agent, or Firm—Louis A. Morris

(57) ABSTRACT

The present invention pertains to an improved process for the preparation of quasi-crystalline boehmite. In this improved process a quasi-crystalline boehmite precursor is aged at a pH below 7, prefereably under hydrothermal conditions. It was found that when conducting the preparation processes for quasi-crystalline aluminas described in the prior art at a pH below 7 and under hydrothermal conditions instead of the high pH and thermal aging used in the prior art, QCBs with higher crystallinity are obtained. In the process according to the invention additives may be added to the quasi-crystalline boehmite precursor. This results in a high quality QCB with additives in a homogeneously dispersed state. Suitable additives are compounds containing elements selected from the group of rare earth metals alkaline earth metals, transition metals, actinides, silicon, gallium, boron, and phosphorus.

13 Claims, 4 Drawing Sheets

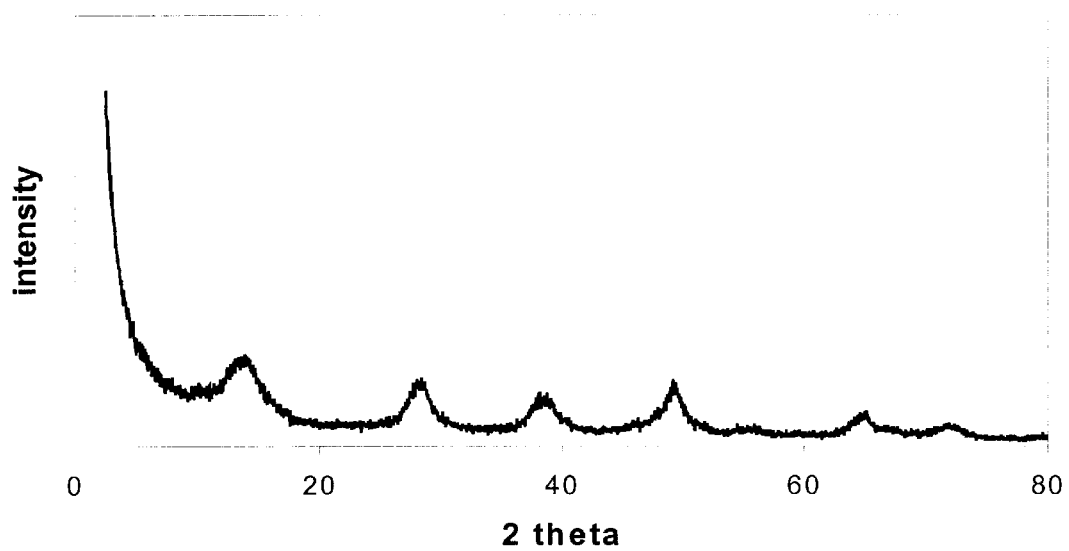
Figure 1. XRD of Catapal

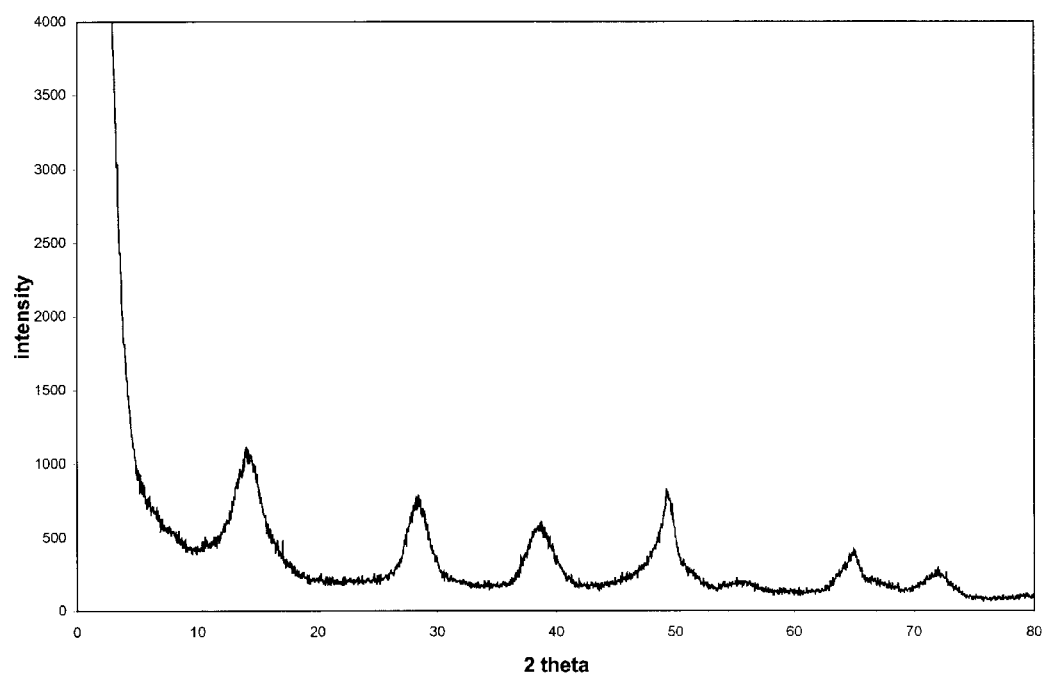
Figure 2 QCB prepared from Al isopropoxide and thermal aging

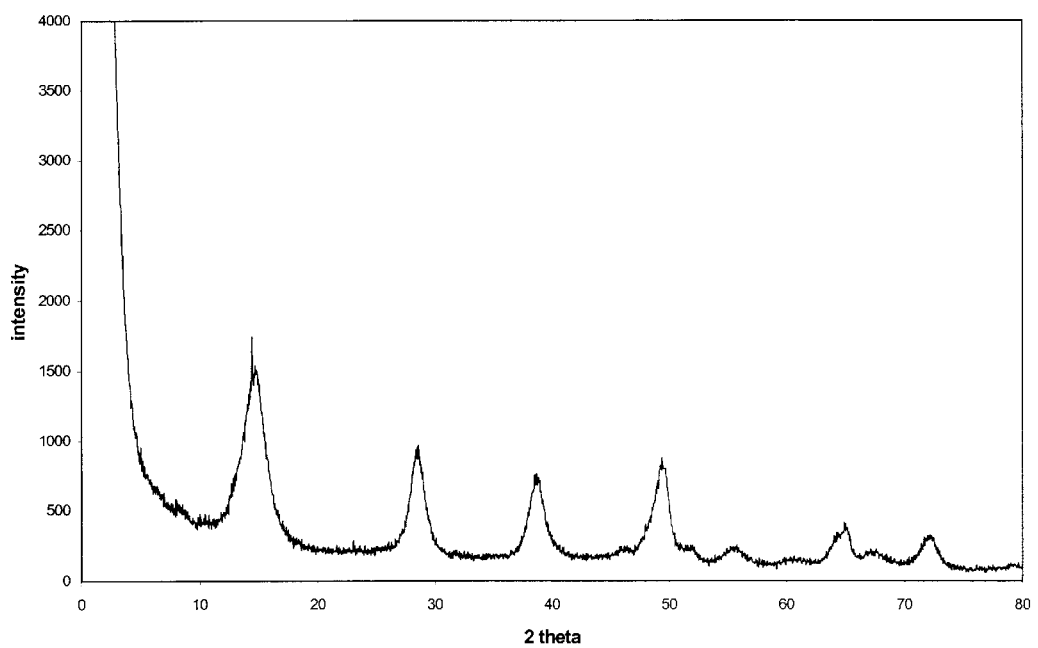
Figure 3 QCB prepared by hydrothermal treatement at pH=4

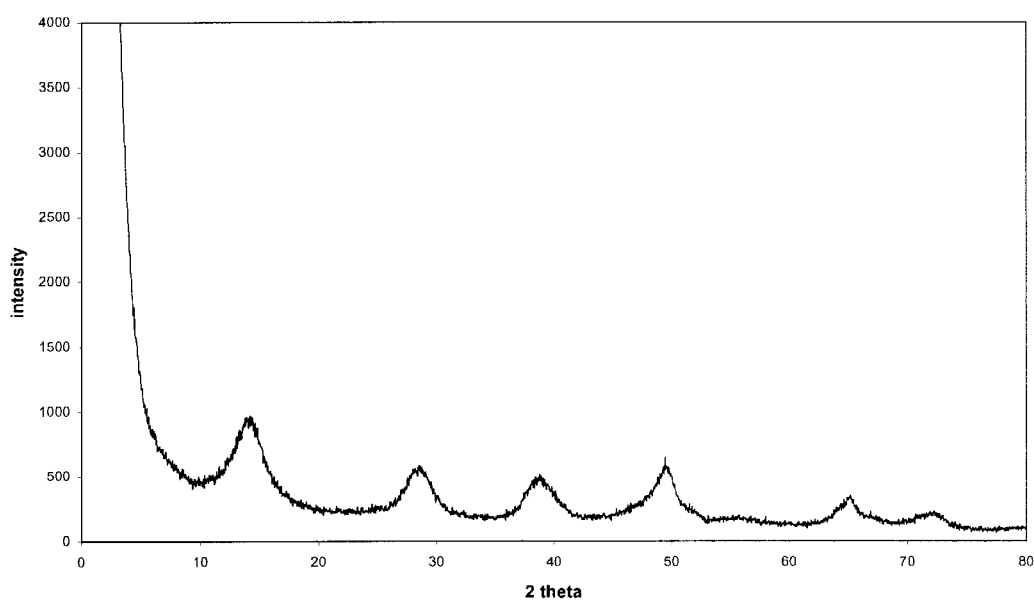
Figure 4 QCB prepared with Wachowski process

PROCESS FOR THE PREPARATION OF QUASI-CRYSTALLINE BOEHMITES

CROSS REFERENCE TO RELATED APPLICATION

This application is a continuation-in-part of U.S. application Ser. No. 09/372,557, filed Aug. 11, 1999, now abandoned.

BACKGROUND OF THE INVENTION

1. Field of the Invention

The present invention pertains to a process for the preparation of quasi-crystalline boehmites.

2. Description of the Prior Art

Alumina, alpha-monohydrates or boehmites and their dehydrated and or sintered forms are some of the most extensively used aluminum oxide-hydroxides materials. Some of the major commercial applications involve one or more forms of these materials and these are, for example, ceramics, abrasive materials, fire-retardants, adsorbents, catalysts, fillers in composites and so on. Also, a major portion of the commercial boehmite aluminas is used in catalytic applications such as refinery catalysts, catalyst for hydroprocessing hydrocarbon feeds, reforming catalysts, pollution control catalysts, cracking catalysts. The term "hydroprocessing" in this context encompasses all processes in which a hydrocarbon feed is reacted with hydrogen at elevated temperature and elevated pressure. These processes include hydrodesulfurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. These types of aluminas are also used as catalysts for specific chemical processes such as ethylene-oxide production, and methanol synthesis. Relatively newer commercial uses of boehmite type of aluminas or modified forms thereof involve the transformation of environmentally unfriendly chemical components such as chlorofluorohydrocarbons (CFC's) and other undesirable pollutants. Boehmite alumina types are further used as catalytic material for the treatment of exhaust gases of gas turbines for reducing nitrogen oxide.

The main reason for the successful extensive and diversified use of these materials in such variety of commercial uses, is their ability and flexibility to be "tailor" made to products with a very wide range of physical-chemical and mechanical properties.

Some of the main properties which determine the suitability of commercial applications involving gas-solid phase interactions such as catalysts and adsorbents are pore volume, pore size distribution, pore texture, specific density, surface areas, density and type of active centers, basicity and acidity, crushing strength, abrasion properties, thermal and hydrothermal aging (sintering) and long term stability.

To a large extent, the desired properties of the alumina product can be obtained by selecting and carefully controlling certain parameters which usually involve: raw materials, impurities, precipitation or conversion process conditions, aging conditions and subsequent thermal treatments (calcination/steaming) and mechanical treatments.

Nevertheless, in spite of all this large and diversified existing know-how, this technology still develops and presents unlimited scientific and technological challenges both to the manufacturers and end-users for further developments of such alumina based materials.

The term, boehmite, is used in the industry to describe alumina hydrates which exhibit XRD patterns close to that of the aluminum oxide-hydroxide [AlO(OH)], naturally occurring boehmite or diaspore. Further, the general term, boehmite, usually is used to broadly describe a wide range of alumina hydrates which contain different amounts of water of hydration, have different surface areas, pore volumes, specific densities, and exhibit different thermal characteristics upon thermal treatments. Yet their XRD patterns, although they exhibit the characteristic boehmite [AlO(OH)] peaks, usually vary in their widths and can also shift in their location. The sharpness of the XRD peaks and their location have been used to indicate degree of crystallinity, crystal size, and amount of imperfections.

Broadly, there are two categories of boehmite aluminas. Category I, in general, contains boehmites which have been synthesized and/or aged at temperatures close to 100° C. and most of the time under ambient atmospheric pressures. In the present specification, this type of boehmite is referred to as quasi-crystalline boehmites. The second category of boehmite consists of so-called microcrystalline boehmites.

In the state of the art, category I boehmites, quasi-crystalline boehmites, are referred to, interchangeably as: pseudo-boehmites, gelatinous boehmites or quasi-crystalline boehmites (QCB). Usually these QCB aluminas have very high surface areas, large pores and pore volumes, lower specific densities than microcrystalline boehmites, disperse easily in water or acids, they have smaller crystal sizes than microcrystalline boehmites, and contain a larger number of water molecules of hydration. The extent of hydration of the QCB can have a wide range of values, for example from about 1.4 up and about 2 moles of water per mole of AlO, intercalculated usually orderly or otherwize between the octahedral layers.

The DTG (differential thermographimetry) curves, which are the water release from the QCB materials as function of temperature, show that the major peak appears at much lower temperatures as compared to that of the much more crystalline boehmites.The XRD Patterns of QCBs show quite broad peaks and their half-widths are indicative of the crystal sizes as well as degree of crystal perfection.

The broadening of the widths at half-maximum intensities varies substantially and typical for the QCB's could be from about 2°–6° to 2θ. Further, as the amount of water intercalated into the QCB crystals is increased, the main (020) XRD reflection moves to lower 2 θ values corresponding to greater d-spacings. Some typical, commercially available QCB's are; Condea Pural ®, Catapal ® and Versal® products.

The category II of the boehmites consists of microcrystalline boehmites (MCB), which are distinguished from the QCBs due to their high degree of crystallinity, relatively large crystal sizes, very low surface areas, and high densities. Contrary to the QCB's the MCB's show XRD patterns with higher peak intensities and very narrow half-peak line widths. This is due to the relatively small number of water molecules intercalated, large crystal sizes, higher degree of crystallization of the bulk material and to lesser amount of crystal imperfections present. Typically, the number of molecules of water intercalated can vary in the range from about 1 up to about 1.4 per mole of AlO. The main XRD reflection peaks (020) at half-length of maximum intensities have widths from about 1.5 down to about 0.1 degrees 2-theta (2θ). For the purpose of this specification we define quasi-crystalline boehmites to have 020 peak widths at half-length of the maximum intensity of 1.5 or greater than 1.5°.

Boehmites having a (020) peak width at half-length of the maximum intensity smaller than 1.5 are considered microcrystalline boehmites.

A typical MCB commercially available product is Condea's P-200 ® grade of alumina. Overall, the basic, characteristic differences between the QCB and MCB types of boehmites involve variations in the following: 3-dimensional lattice order, sizes of the crystallites, amount of water intercalated between the octahedral layers and degree of crystal imperfections.

Regarding the commercial preparation of these boehmite aluminas, QCB's are most commonly manufactured via processes involving: Neutralization of aluminum salts by alkalines, acidification of aluminate salts, hydrolysis of aluminum alkoxides, reaction of aluminum metal (amalgamated) with water and rehydration of amorphous rho-alumina obtained by calcining gibbsite. The MCB type of boehmite aluminas, in general are commercially produced with hydrothermal processes using temperatures usually above 150° C. and autogeneous pressures. These processes usually involve hydrolysis of aluminum salts to form gelatinous aluminas, which are subsequently hydrothermally aged in an autoclave at elevated temperatures and pressures. This type of process is described in U.S. Pat. No. 3,357,791. Several variations of this basic process exist involving different starting aluminum sources, additions of acids or salts during the aging, and a wide range of process conditions.

MCB's are also prepared using hydrothermal processing of gibbsite. Variations of these processes involve; addition of acids, alkaline and salts during the hydrothermal treatment, as well as the use of boehmite seeds to enhance the conversion of gibbsite to MCB. These types of processes are described in Alcoa's U.S. Pat. No. 5,194,243, in U.S. Pat. No. 4,117,105 and in U.S. Pat. No. 4,797,139.

Nevertheless, whether pseudo-, quasi- or microcrystalline such boehmite materials are characterized by reflections in their powder X-ray. The ICDD contains entries for boehmite and confirms that reflections corresponding to the (020), (021) and (041) planes would be present. For copper radiation, such reflections would appear at 14, 28 and 38 degrees two theta. The various forms of boehmite would be distinguished by the relative intensity and width of the reflections. Various authors have considered the exact position of the reflections in terms of the extent of crystallinity. Nevertheless, lines close to the above positions would be indicative of the presence of one or more types of boehmite phases.

In the prior art, we find QCB containing metal ions which have been prepared by the hydrolysis of alumina isopropoxide with the co-precipitation of lanthanides as described in the paper by J. Medena, J. Catalysis, vol. 37, 91-(1975), and J. Wachowski et al., Materials Chemistry, vol. 37, 29–38 (1994). This process is conducted at a pH above 7.0. The products are pseudo-boehmite type aluminas with the occlusion of one or more lanthanide metal ions. These materials have been primarily used in high temperature commercial applications where the presence of such lanthanide metal ions in the pseudo-boehmite structure retards the transformation of the gamma-alumina to the alpha-alumina phase. Therefore, a stabilization of the gamma phase is obtained, retaining a higher surface area before it converts to the refractory lower surface area alpha-alumina. Specifically Wachowski et al. used the lanthanide ions (La, Ce, Pr, Nd, Sm) in quantities from 1% to 10% by weight which were calcined at temperatures in the range of 500° C. to 1200° C.

Also, EP-A1-0 597 738 describes the thermal stabilization of alumina by addition of lanthanum, optionally combined with neodymium. This material is prepared by aging rehydrateable alumina (i.e. flash calcined gibbsite) in a slurry at a pH between 8 and 12 with a lanthanum salt at a temperature between 70 and 110° C., followed with thermal treatment at a temperature between 100 and 1000° C.

Further, EP-A-0 130 835 describes a catalyst comprising a catalytically active metal supported on a lanthanum or neodymium-$\beta$-$Al_2O_3$ carrier. Said carrier is obtained by precipitation of aluminum nitrate solution with ammonium hydroxide in the presence of a lanthanum, praseodymium or neodymium salt solution. As the precipitated amorphous material is directly washed with water and filtered, the alumina is not allowed under the usual conditions and certain pH, concentration and temperatures to age with time so that it crystallizes to a boehmite alumina structure.

SUMMARY OF THE INVENTION

The present invention is directed to an improved process for the preparation of quasi-crystalline boehmite. In this improved process a quasi-crystalline boehmite precursor is aged at a pH below 7, preferably under hydrothermal conditions.

Other objectives and embodiments of our invention encompass details about compositions, manufacturing steps, etc., all of which are hereinafter disclosed in the following discussion of each of the facets of the present invention.

BRIEF DESCRIPTION OF THE DRAWINGS

FIG. 1 is an X-ray diffractogram (XRD) for the spectrum of Catapal A® of Vista Chemicals.

FIG. 2 is the XRD pattern of the QCB formed in the procedure of Example 2.

FIG. 3 is the XRD pattern of the QCB formed in the procedure of Example 3.

FIG. 4 is the XRD pattern of the QCB formed in the procedure of Comparative Example 4.

DETAILED DESCRIPTION OF THE INVENTION

It was found that when conducting the preparation processes for quasi-crystalline aluminas at a pH below 7, preferably under hydrothermal conditions, instead of at a high pH in combination with the thermal aging as is described in the prior art, QCBs with higher crystallinity are obtained. Suitable quasi-crystalline boehmite precursors are aluminum alkoxide, soluble aluminum salts such as aluminum sulfate, aluminum nitrate, aluminum chloride and sodium aluminate, thermally treated aluminum trihydrate such as flash calcined aluminum trihydrate (CP ® alumina), amorphous gel alumina, QCBs with relatively low crystallinity, aluminum trihydrate such as gibbsite, BOC and bayerite and mixtures thereof, In the process according to the invention additives may be added to the quasi-crystalline boehmite precursor. This results in a high quality QCB with additives in a homogeneously dispersed state. It was found that when using a pH below 7 the additives in the resulting QCB are even more homogeneously dispersed than when using the higher pH and thermal aging of the prior art processes. In fact, it was found that some additives can only be added in a homogenously dispersed state at these low pHs such as lanthanum nitrate and nickel salts. At higher pHs, the additives precipitate readily as a separate phase. Additives present in QCB aid to adjust the QCBs physical, chemical and catalytic properties such as thermal stability, specific density, surface area, pore volume, pore size distribution, density and type of active centers, basicity and acidity, crushing strength, abrasion properties etc., and so determine the boehmite's suitability for use in catalytic or absorbent material. The fact that the additive is homogeneously dispersed within the QCB distinguishes the QCBs according to the invention from QCBs which have been impregnated with additives, and renders these new QCBs extremely suitable for catalytic purposes or as starting materials for the preparation of catalysts for heterogeneous catalytic reactions. For the purpose of the invention, it is stated that a homogenous dispersion of the additive is present in the QCB if the X-ray diffraction pattern has no reflections of the additive, and thus the additive is not present as a separate phase. It is, of course, possible to incorporate different types of additives in the QCB according to the invention.

Suitable additives are compounds containing elements selected from the group of rare earth metals, alkaline earth metals, alkaline metals, transition metals, actinides, noble metals such as Pd and Pt, silicon, gallium, boron, titanium, and phosphorus. For instance, the presence of silicon increases the amount of acidic sites in the boehmite, transition metals introduce catalytic or absorbing activity such as $SO_x$ captivation, $NO_x$ captivation, hydrogenation, hydroconversion, and other catalytic systems for gas/solid interactions.

Suitable compounds containing the desired elements are nitrates, sulfates, chlorides, formates, acetates, carbonates, vanadates etc. The use of compounds with decomposable anions is preferred, because the resulting QCBs with additive may directly be dried, without any washing, as undesirable anions for catalytic purposes are not present.

The QCBs according to the invention may be prepared in several ways as long as the aging step is conducted at a pH below 7. The process is preferably conducted under hydrothermal conditions. In general a quasi-crystalline boehmite precursor and optionally additive are aged, preferably under hydrothermal conditions, to form a quasi-crystalline alumina. The aging may be conducted hydrothermally, which means in the presence of a protic liquid or gas such as water, ethanol, propanol or steam and under pressure, i.e. with increased pressure such as aging in water at a temperature above 100° C. under autogeneous pressure. Examples of suitable preparation processes are described below:

Process 1

The QCB can be prepared by hydrolyzing and aging an aluminum alkoxide, preferably under hydrothermal conditions. Any additive can be incorporated during the hydrolysis step or added at the end before the aging step.

Process 2

The QCB may be prepared by hydrolysis and precipitation as hydroxides of soluble aluminum salts and aged, preferably hydrothermally, to form a QCB. Examples of suitable alumnium salts are aluminum sulfate, aluminum nitrate, aluminum chloride, sodium aluminate, and mixtures thereof. The additive(s) may be added simultaneously during hydrolysis and coprecipitation or at the end in the aging step.

Process 3

The QCB can also be prepared by aging a slurry containing a thermally treated form of aluminum trihydrate and optionally additive for a time sufficient to form QCB. Thermally treated forms of aluminum trihydrate are calcined aluminum trihydrate and flash calcined aluminum trihydrate (CP® alumina). This preparation method has the advantage that no ions are introduced into the QCB besides ions of an optional additive compound. That means that with the appropriate choice of additive compounds washing steps can be reduced or avoided altogether. For instance, when additive compounds are used with decomposable anions (such as carbonates, nitrates and formates), the QCB containing additive may be dried directly, since undesirable cations for catalytic purposes will not be present. A further advantage of this preparation method is that it is possible to first shape a slurry containing a thermally treated form of aluminum trihydrate and optionally additive, reslurry the shaped bodies, and subsequently age the shaped bodies to form QCB. Shaping is defined in this specification as any method of obtaining particles with the appropriate size and strength for the specific purpose. Suitable shaping methods are spray-drying, extrusion (optionally with intermediate spray-drying, filterpressing, or kneading), pelletizing, beading or any other conventional shaping method used in the catalyst field.

Process 4

The QCB can also be prepared by aging a slurry containing amorphous gel alumina and optionally additive(s)for a time sufficient to form QCB. Like process 4 mentioned above, this preparation method has also the advantage that no ions are introduced into the QCB beside optionally any ions of the additive compound. That means that with the appropriate choice of additive compounds washing steps can be reduced or avoided altogether. Also is it possible to first shape a slurry containing amorphous alumina gel and optional additive, reslurry the shaped bodies, and subsequently age the shaped bodies to form QCB. In this case care must be taken to choose a shaping step in which the amorphous gel alumina/additive mixture are not heated to temperature exceeding the aging temperature.

Process 5

QCBs according to the invention may also be prepared by aging, preferably by hydrothermal treatment, a relatively amorphous QCB, optionally in the presence of compounds of a desired additive. The crystallinity increases to some extend, but the resulting product is still a QCB according to the definition of the present description. This process also allows shaping of the QCB-additive mixture before the thermal treatment. Further, no additional ions besides the optional ions of the additive compound are introduced in the QCB.

Process 6

QCBs may also be prepared by aging, preferably by hydrothermal treatment alumina trihydrates such as gibbsite, BOC and bayerite, with the help of suitable boehmite seeds in the presence of compounds of the desired additives. Suitable seeds are the known seeds to make microcrystalline boehmite such as commercially available boehmite (Catapal®, Condea®Versal, P-200® etc.), amorhous seeds, milled boehmite seeds, boehmite prepared from sodium aluminate solutions, etc.. Also quasi-crystalline boehmites prepared by one of the processes described here can suitably be used as a seed. It was found that aging at a pH below 7 favors the production of QCBs over MCBs. Like processes 3, 4, and 5 no additional ions besides the optional ions of the additive are introduced into the QCB, and this process allows shaping prior to the aging step.

Although, processes 5 and 6 described-above are known for the preparation of microcrystalline boehmites, we found that aging at a pH below 7 favors the production of QCBs over MCBs. Further, the process can be adapted to form QCBs by adjusting the seed and the conditions used.

The first publications on the use of seeds in the hydrothermal conversion of aluminum trihydrate date back in the late 1940's/early 1950's. For example, G. Yamaguchi and K. Sakamato (1959), cleary demonstrate the concept that boehmite seeds substantially improved the kinetics of the hydrothermal conversion of gibbsite to boehmite, by lowering the temperature, shorten the reaction time, and increase the gibbsite conversion.

Also the beneficial principle of seeding with boehmite in the hydrothermal transformation of gibbsite in an autoclave operating at elevated temperatures and autogeneous pressures was also demonstrated clearly by G. Yamaguchi and H. Yamanida 1963).

There are several other publications in the open literature, in which equally well the benefits of seeding with boehmite and/or alkaline solutions are demonstrated. Further, the use of boehmite seed is also claimed to produce finer particle size boehmite product which is easier to disperse in water. The use of boehmite seeds in the hydtrothermal conversion of gibbsite has been described in U.S. Pat. No. 4,797,139, filed on Dec. 16, 1987 and in U.S. Pat. No. 5,194,243, filed on Sep. 30, 1985.

In all the above-described processes an intermediate calcination step, prior to the aging step may be applied.

All the processes described above may be conducted batch-wize or in a continuous mode, optionally in a continuous multi step operation. The processes may be conducted partly continuous, partly batchwize.

As mentioned-above, more than one type of QCB precursor may be used, although care must be taken that the reaction conditions employed enable the conversion of the precursor to QCB. Said mixture of QCB precursors may be prepared before introduction of the additive or the various types of precursors may be added in any of the further stages of the reaction.

In the processes for the preparation of the QCBs according to the invention more than one aging step may be applied, wherein for instance the aging temperature and/or condition (thermally or hydrothermally, pH, time) is varied.

The reaction products of the processes for the preparation of the QCBs according to the invention may also be recycled to the reactor.

If more than one type of additive is incorporated into the QCB, the various additives may be added simultaneously or sequentially in any of the reaction steps.

It may be advantageous to add acids or bases to adjust the pH during the hydrolysis and/or precipitation.

As mentioned-above some of the processes for the preparation of the quasi-crystalline boehmites according to the invention allow shaping into shaped bodies during preparation. It is also possible to shape the final QCB, optionally with the help of binders and/or fillers. The invention is also directed to shaped bodies obtained with the process according to the invention.

As mentioned above, the QCBs according to the invention are extremely suitable as components or starting material for catalyst compositions or catalyst additives. To this end the QCB is combined with, optionally, binders, fillers (e.g. clay such as kaolin, titanium oxide, zirconia, silica, silica-alumina, bentonite etc.), catalytically active material such as molecular sieves (e.g.ZSM-5, zeolite Y, USY zeolite), and any other catalyst components such as for instance pore regulating additives, which are commonly used in catalyst compositions. For some applications it may be advantageous to neutralize the QCB before use as catalyst component, for instance to improve or create pore volume. Further, it is preferred to remove any sodium to a content below 0.1 wt % $Na_2O$. The present invention therefore is also directed to catalyst compositions and catalyst additives comprising the QCB according to the invention.

In a further embodiment of the invention, the QCB may be mixed with other metal oxides or hydroxides, binders, extenders, activators, pore regulating additives, etc. in the course of further processing to produce absorbents, ceramics, refractories, substrates, and other carriers.

For catalytic purposes, boehmites are generally used at temperatures between 200 and 1000° C. At these high temperatures the boehmites are usually converted into transition-aluminas. Therefore, the present invention is also directed to transition alumina which is obtainable by thermal treatment of the quasi-crystalline boehmite prepared with the process according to the invention.

With the above-mentioned transition aluminas catalyst compositions or catalyst additives can be made, optionally with the help of binder materials, fillers, etc.

The present invention will be illustrated by means of the following non-limiting examples.

EXAMPLES

Comparative Example 1

An XRD pattern of a sample of commercially available quasi-crystalline boehmite, Catapal A® is given in FIG. 1.

Comparative Example 2

A quasi-crystalline boehmite was prepared from hydrolysis of aluminum isopropoxide and aged at 65° C. for 5 days. The XRD pattern is given in FIG. 2.

Example 3

The product of Comparative example 4 reslurried in water and aged at a pH of 4 at a temperature of 198° C. for 1 hour. The XRD pattern is shown in FIG. 3.

Comparative Example 4

A quasi-crystalline boehmite was produced using the process of Wachowski containing 5 wt % lanthanum ions (calculated at the oxide). The XRD pattern is given in FIG. 4.

Example 5

The product of Comparative example 4 was re-slurried in water, the pH was adjusted to 4 and the slurry was hydrothermally treated at 198° C. for 1 hour. Comparison of the XRD of the product of example 4 and the XRD of the product of example 5 shows that when using the hydrothermal conditions and low pH according to the process of the invention, an improved crystallinity is obtained.

Example 6

5 wt % lanthanum nitrate (calculated as the oxide) in solution was added to a slurry containing fine particle Gibbsite and 20% Catapal A alumina ® as a seed. The pH was adjusted between 4 and 6 and homogenized. In an autoclave the resulting slurry was heated to 180° C. for 2 hours under autogeneous pressure.

Example 7

Example 1 was repeated using finely ground BOC. 10 wt % of Catapal A, strongly peptized with nitric acid, was used as a seed. The pH was adjusted to 6, and 10 wt % lanthanum nitrate (calculated as oxide) in solution was added. The resulting slurry was homogenized in a blender and transferred to an autoclave where it was heated under autogeneous pressure to 175° C. for 2 hours.

Example 8

Example 6 was repeated using sodium aluminate (10 wt % calculated as alumina) as a seed. The pH was adjusted between 6 and 7 with nitric acid, and 5 wt % lanthanum nitrate (calculated as oxide) in solution was added. The resulting slurry was homogenized in a blender and transferred to an autoclave where it was heated under autogeneous pressure to 165° C. for 2 hours.

What is claimed is:

1. A process for the preparation of quasi-crystalline boehmite having a peak width at half length of the maximum intensity of the (020) XRD reflection of 1.5 or greater than 1.5 degrees 2 theta, wherein a quasi-crystalline boehmite precursor is aged at a pH below 7 to obtain said quasi-crystalline boehmite, wherein the quasi-crystalline boehmite precursor is selected from the group consisting of alumnium alkoxide, aluminum trihydrate, and mixtures thereof.

2. The process of claim 1 wherein the aging is conducted under hydrothermal conditions.

3. The process of claim 1 wherein the quasi-crystalline boehmite precursor is aged in the presence of an additive.

4. The process of claim 3 wherein the additive is a compound containing an element selected from the group consisting of rare earth metals, alkaline earth metals, transition metals, actinides, silicon, boron, and phosphorus.

5. The process of claim 1 wherein more than one quasi-crystalline boehmite precursor is aged.

6. The process of claim 1 wherein aluminum alkoxide is hydrolyzed and aged to form quasi-crystalline boehmite.

7. The process of claim 1 wherein said precursor comprises aluminum trihydrate and a boehmite seed which are aged to form said quasi-crystalline boehmite.

8. The process of claim 1 wherein the quasi-crystalline boehmite precursor is shaped into a shaped body prior to aging.

9. The process of claim 1 which is conducted in a continuous mode.

10. The process of claim 9 wherein said preparation is carried out in a reactor and the reaction products are recycled to said reactor.

11. The process of claim 1 wherein more than one aging step is used.

12. The process of claim 1 wherein the quasi-crystalline boehmite formed in the aging step is shaped into a shaped body.

13. A process for the preparation of transition alumina by thermal teatment of a quasi-crystalline boehmite prepared according to the process of claim 1.

* * * * *